US007075767B2

(12) United States Patent
Gemme et al.

(10) Patent No.: US 7,075,767 B2
(45) Date of Patent: Jul. 11, 2006

(54) FAULT CURRENT LIMITING SYSTEM AND METHOD

(75) Inventors: Carlo Gemme, Pavia (IT); Richard Tinggren, Thalwil (CH); Karl-Heinz Hartung, Badhonnef (DE); Lars Liljestrand, Vasteras (SE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 10/710,254

(22) Filed: Jun. 29, 2004

(65) Prior Publication Data

US 2005/0002152 A1 Jan. 6, 2005

Related U.S. Application Data

(63) Continuation of application No. PCT/EP02/14890, filed on Dec. 27, 2002.

(30) Foreign Application Priority Data

Dec. 31, 2001 (EP) ................................. 01205190

(51) Int. Cl.
*H02H 1/00* (2006.01)
*H01H 85/26* (2006.01)

(52) U.S. Cl. ....................................... 361/125; 337/284

(58) Field of Classification Search ................ 361/125; 337/284

See application file for complete search history.

(56) References Cited

U.S. PATENT DOCUMENTS 520,378 A * 5/1894 Parson ....................... 337/284
1,930,485 A * 10/1933 Murray et al. .............. 361/102
2,051,771 A * 8/1936 Schultz et al. .............. 337/284
2,150,249 A * 3/1939 Sanford ....................... 337/284
2,304,619 A * 12/1942 Witzel ........................ 337/284
4,489,362 A * 12/1984 Castonguay et al. ......... 361/609
4,644,438 A * 2/1987 Puccinelli et al. ............ 361/75
4,710,847 A * 12/1987 Kortschinski et al. ...... 361/125
2002/0097542 A1* 7/2002 Perichon ...................... 361/63

FOREIGN PATENT DOCUMENTS

CH 311 386 A 11/1955
DE 850 018 C 9/1952

(Continued)

OTHER PUBLICATIONS

"Electronically Controlled Current Limiting Fuses", Tung Chao, Record of the Annual Pulp and Paper Industry Technical Conference, Vancouver, Canada, Jun. 12-16, 1995, New York, NY, IEEE, US, Jun. 12, 1995, pp. 205-222, XP000738189, ISBN 0-7803-2419-6.

*Primary Examiner*—Phuong T. Vu
*Assistant Examiner*—Scott Bauer
(74) *Attorney, Agent, or Firm*—Connolly Bove Lodge & Hutz LLP; Larry J. Hume

(57) ABSTRACT

A fault current limiting system includes switching means for providing a fast switching operation; a parallel current path comprising a limiting fuse; and a switching system to automatically replace a blown set of fuses with an unblown set of fuses after a fault current limiting operation has occurred. A method of limiting fault current includes providing a fast switching operation; providing a parallel current path comprising a limiting fuse; and automatically replacing a blown set of fuses with an unblown set of fuses after a fault current limiting operation has occurred.

11 Claims, 3 Drawing Sheets

FOREIGN PATENT DOCUMENTS

| | | | |
|---|---|---|---|
| DE | 1 050 430 | B | 2/1959 |
| DE | 11 91 884 | B | 4/1965 |
| DE | 30 06 336 | A | 8/1981 |
| FR | 2 478 868 | A | 9/1981 |

* cited by examiner

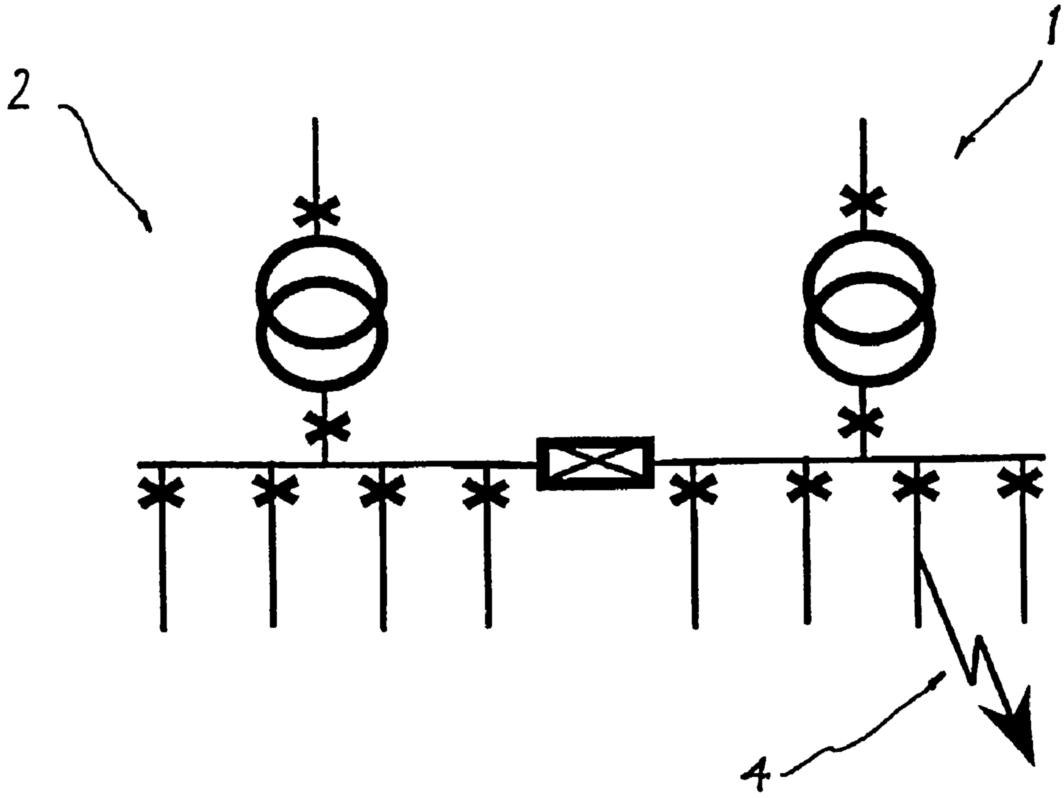
FIG. 1 (CONVENTIONAL)

FAULT CURRENT LIMITING SYSTEM AND METHOD

CROSS REFERENCE TO RELATED APPLICATIONS

This Application is a Continuation of Application PCT/EP02/14890 filed on Dec. 27, 2002. Application PCT/EP02/14890 claims priority for Application EP 01205190.0 filed on Dec. 31, 2001 in European Patent Office. Each of PCT/EP02/14890 and EP 01205190.0 are incorporated herein by reference.

BACKGROUND OF THE INVENTION

This disclosure relates to a fault current limiting system and method, and in particular relates to a system and method for high-speed short-circuit current interruption.

Bus-tie components which are able to interrupt very high short-circuit current in a time period which is a fraction of a period of the current are known in the art.

The goal of conventional fault current limiting components is to allow downsizing of both left and right bus-bar systems, in comparison with the total short circuit current supplying a feeder, as represented in FIG. 1.

The downsizing is reached by dimensioning each side of the switchboard for only the short circuit power of its relevant in-coming feeder. This downsizing is possible only when a very fast interrupting device is located in the bus-tie position. With reference to FIG. 1, in the case of a short circuit condition (4) of the out-going feeder (1), e.g. in the right hand side of the switchboard in FIG. 1, the very fast interrupting device should be able to avoid any contribution to short circuit peak current coming from the other half (2) of the switchboard not affected by fault conditions, i.e., the left hand side of the switchboard in FIG. 1.

This downsizing is extremely interesting in economic terms for a new electrical installation, where all the new equipment can be purchased for a fraction of the total short circuit power supplying the complete installation plant, with corresponding relevant savings. Cost savings can also be achieved in case of installation up-grade, when an existing plant has to be adapted to an increase demand, thus avoiding the necessity for upgrading and changing all existing apparatus.

The above-described solution can be easily implemented by simply using a fuse in the bus-tie compartment. However, fuse technology has certain limitations, and it is not always possible to have fuses with a satisfactory nominal current. Therefore, in conventional practice, the use of a fuse in the bus-tie compartment is only effective for very small installations.

The solution for bigger installations foresees the use of a fuse, which is supplied only by the short circuit current, while the nominal current is normally let through a low resistance parallel element.

This parallel element may be an explosive cartridge, which is detonated at the moment the short circuit condition is detected. A control device takes care of detecting this short circuit, by both measuring the current amplitude and its rate of rise.

The present state of the art, although satisfactory for the basic needs, has some disadvantages.

At the end of the short circuit intervention, the whole system, including both the explosive cartridge and the fuse, needs to be replaced before allowing the distribution system to recover complete functionality. This requires a maintenance operation, which takes time, and requires non-conventional spare parts, such as the explosive cartridge. During this maintenance time, the system is operating on both sides but not with the full short circuit power available, i.e., no loads are disconnected, but some operating condition may not be possible due to voltage drop and start-up limitations.

Also, all the working functionality is based on an explosive device which, in some countries, can create difficulties in transportation and/or property permissions, or in others, simply be banned.

A further disadvantage is given by the fact that the explosive-cartridge requires an electronic control that is separated from the switchboard control system. This requires, in practical terms, to have at least two different electronic control devices inside the switchboard, with all difficulties related to this.

BRIEF SUMMARY OF THE INVENTION

In one embodiment, one goal of this disclosure is to further improve the already valid present solution, by overcoming all the above-described disadvantages or limitation, keeping from the other side, all of the advantages.

In particular, a further goal of this disclosure is to have a system which allows automatic recovery of the complete system functionality immediately after the short circuit intervention.

Another goal of this disclosure is to have a system which does not need the use of any explosive.

Still a further goal of this disclosure is to have a system which integrates the specific fault current limiting control requirement inside the main switchboard control system.

In one embodiment, a fault current limiting system includes switching means for providing a fast switching operation; a parallel current path comprising a limiting fuse; and a switching system to automatically replace a blown set of fuses with an unblown set of fuses after a fault current limiting operation has occurred.

In one aspect of this embodiment, an electrical distribution switchboard may include the fault current limiting system described above.

An another embodiment, a method of limiting fault current includes providing a fast switching operation; providing a parallel current path comprising a limiting fuse; and automatically replacing a blown set of fuses with an unblown set of fuses after a fault current limiting operation has occurred.

BRIEF DESCRIPTION OF THE DRAWINGS

Embodiments of a system and method will be described below with reference to the attached drawings in which:

FIG. 1 shows a conventional feeder system with left and right bus-bar systems;

DETAILED DESCRIPTION

These and other goals are achieved by the system according to this disclosure, which relates, in various embodiments and aspects, to a novel type of fault current limiting system and method. The fault current limiting system of this disclosure is based on the use of combined fast switch and an electrical fuse in parallel; after a fault is detected the fast switch opens in a very short time and transfer the current to the fuse, which is able to blow out thereby interrupting the short-circuit current. Furthermore, an automatic system takes care of replacing the blown-out fuse set with a brand new one.

The fault current limiting system of this disclosure includes advantages such as an increased perceived value of the solutions by the customer by providing full system functionality restoration in a short time; increase the potential market; and less expense than conventional solutions.

Figure 3:
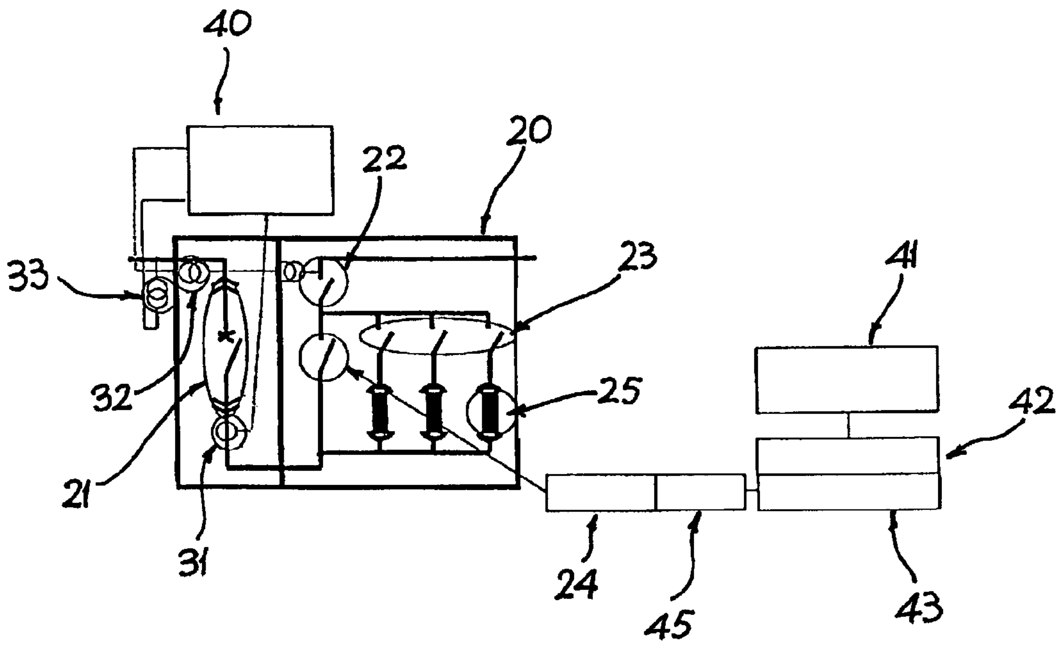
FIG. 3 illustrates an embodiment of a system of the disclosure.

An embodiment of this disclosure will be now described with more details. With reference to FIG. 3, the system may include, in a non-limiting way, some or all of the following elements including a switchboard panel; a fast switch disconnector (24); a number of sets of fuses (25); a fuse revolver switch (23); a circuit breaker (21); a current sensor (31); one or more voltage sensors (32); a voltage transformer (33); a switchboard control unit (40); and an extendable or withdrawable track which includes one or more of the above system components.

A switchboard panel may include an enclosure (20) containing the other system components.

The fast switch device (24) may be a disconnector having the ability to carry the nominal current for an unlimited time, but which may not have any make and break capability. One characteristic is the capacity to open in a very short time as compared to a normal electrical apparatus, for example, in a time on the order of 1 ms.

Another characteristic of the fast switch device is that is develops a relatively high arc voltage during an opening phase. This arc voltage is used to fast commute (in a time in the order of hundred of micro-second) the current in the parallel low resistance path where a limiting fuse is placed.

In order to be so fast during the opening operation, a relatively fast and powerful drive (45) is used. This drive can be based on a Thomson coil (also called repulsion drive or electro dynamic drive), or based upon a voice coil drive. Conveniently, the drive can be controlled by a corresponding electronic drive unit (43) which can be powered, e.g., by capacitors (42) charged by corresponding capacitor chargers (41).

In alternative to the fast switch disconnector, an explosive based cartridge may also be used.

In one embodiment, the system uses limiting fuses. For each phase, several fuses (25) may be arranged in parallel.

The fuse revolver switch (23) is a disconnector whose function is to, after a fault condition is encountered, automatically exchange blown fuses at the end of the fault current limiter system opening operation. This avoids a long out-of-service period for the fault current limiting system by automatically exchanging blown fuses with a new set of unblown fuses.

The number of fuse sets available in the system can vary upon the expected rate of fault of the specific switchgear, or on the will to limit, as much as possible, the maintenance operation time. This can vary from a minimum of two sets, to whatever maximum is believed to be appropriate. For example, 3 sets of replacement fuses (25) could be an optimum number.

The circuit breaker (21) is used, for example, to manage open operation made in absence of fault; manage open operation in the event of a limited fault current which does not require fault current limiter operation; act as final switch-off device at the end of the fault current limiter operation; and to act as a back-up in case of malfunction of the Fault Current Limiting system.

The current sensors (31) may be generic current sensors, with appropriate response time characteristics, to allow electronic control to detect starting fault conditions.

Voltage sensors (32) may be either voltage transformers or resistive/capacitive voltage divider (or any other conventional type). They may be used in order to allow information to be obtained on the absence of presence of voltage on both sides of the bus-bar. These optional sensors may be required when the fault current limiting system is applied as a bus tie current limiter and for automatic restoration of the fault current limiting operation after a fault current limiting system intervention.

A voltage transformer (33) can be used as one possible supply to the system. A second voltage transformer may come from the substation auxiliary supply, which may also have an uninterruptible power supply (UPS) system.

In one embodiment, the switchboard control unit (40) is an electronic device, placed either on the switchboard panel or on the substation control room. In the first case, the control is seen as distributed, and in the second case, the control is seen as centralized.

In the following discussion, the description will describe the system as a distributed system, but the centralized option is also possible. Tasks performed by this electronic device (40) are various, and include control of all components of the system; fast switch protection function; classic protection function accomplished through a circuit breaker; and measurement of electrical quantities related to the switchboard.

Some of the above-described components may be mounted on a moveable track, which can be extracted from the switchboard panel when a maintenance operation is required.

Advantages of the solution provided by embodiments of this disclosure, including use of the moveable track, include easy access to all components mounted on the system; faster maintenance of the panel; the track itself may be allowed to easily integrate two disconnectors, which permit, once the track has been extracted, to operate on the fault current limiter system without difficulties or risk for the operator, and without the need to shut down the electrical power to the complete switchboard (or to one side of it).

As an alternative to the tracked approach, a standard safety disconnector (22) can be integrated on the opposite site of the circuit breaker. The circuit breaker, in this case, will itself be withdrawable and reachable by a maintenance operator, once the safety disconnector (22) is open and the circuit breaker is withdrawn from the enclosure.

Under normal operating conditions, the fault current limiter track may be inserted, the circuit breaker (21) and the fast switch (24) are closed or, in case of the alternative solution, the safety disconnector (22) is closed, and the circuit breaker (21) is inserted.

Figure 2:
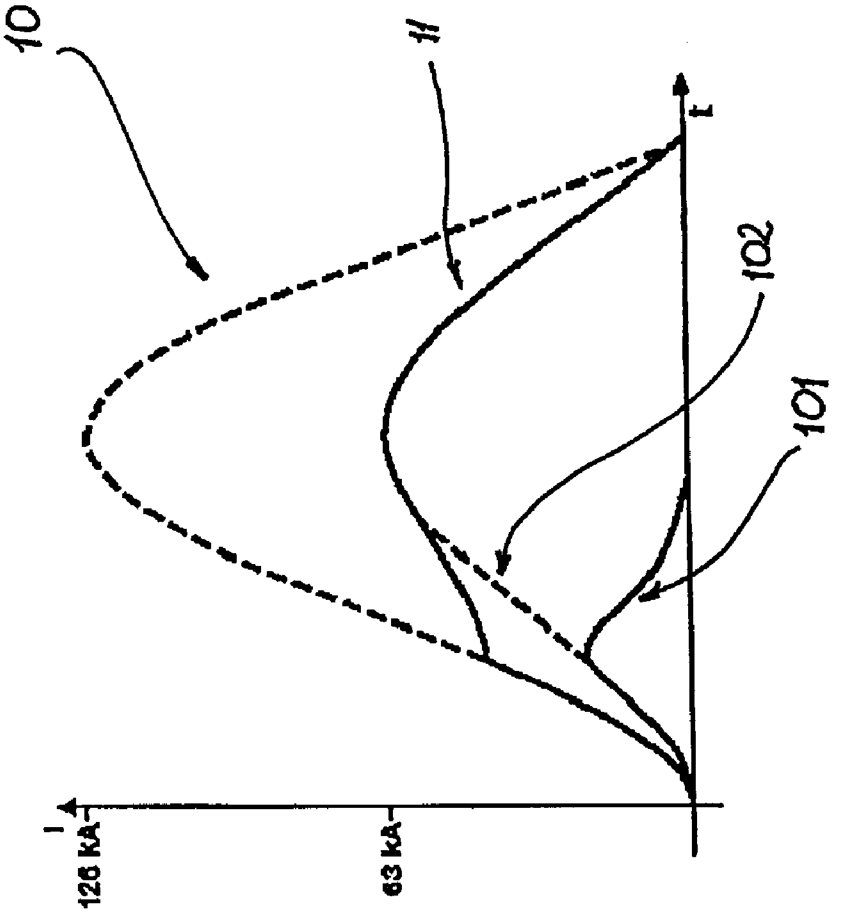
FIG. 2 illustrates representative currents in the system.

In case of fault, the electronic device (40), through the current sensor (31) signals, analyzes the estimated amplitude of the fault, by using both the amplitude and the rate of rise of the signal. In case the foreseen fault rises above a certain threshold, then the command to open is given to the fast switch disconnector (24). Otherwise the signal to open is given, according to the discrimination definition, to the circuit breaker (21). FIG. 2 provides an illustration of representative currents in the system with and without current limitation provided by the system. The dashed line (10) represents the total current I at the short-circuit point for conventional systems, i.e. in the absence of a fault current limiting system according to the present disclosure; the solid line (11) represents the total current I at the short-circuit point for systems comprising a fault current limiting system according to the present disclosure; the lines (101) and (102) represent the individual contribution of the currents $I_1$ and $I_2$ of each feeder, the total current I being the sum $I_1+I_2$.

In case of out-going feeder protection this threshold is the max peak bearable by the switchboard, while in case of bus-tie, this is the portion of the max peak bearable by the switchboard that the opposite side of the switchboard can contribute to the fault. Furthermore, in case the switchboard is supplied by only one side because an in-coming feeder is open, then the fault current limiter can be disabled (by a blocking signal from the controller), if the remaining in-coming feeder can not supply a short circuit power which can be dangerous for the other side of the switchboard.

Once open, the fast switch disconnector (24) generates a relatively high arc voltage across the contacts that forces the current to commutate to the parallel path inside the limiting fuses (25) which consequently melt. After that the circuit breaker (21) is open in its standard operating time, about 100 ms, and this completes the fault current limiter open operation.

With circuit breaker (21) open, the fuse revolver switch (23) commutates from the present, now blown-out set of three fuses to the next one.

Now the system is ready to automatically restore the full system functionality. In case the switchboard control unit (40) finds the system health, then the system is automatically re-close.

In case the fault current limiter is used as a bus tie, than system health means the presence of voltage on both side of the bus bar. In case the Fault Current Limiting system is used as out-going feeder protection, than this means the impedance on the load is higher than a certain threshold.

Once the fuse revolver switch (23) is arrived to the last position, which means no more fuse sets are available in addition to the one in service a signal is issued (either a message, for example a SMS, is sent to the control system operator or an alarm is set on) in order to call for preventive maintenance, in order to avoid not having "good" fuse to use in case or further faults.

An optional protection in case of fast switch disconnector fault is foreseen. This protection can work on several principles, either on arc light, on current detection, or on a pressure rise in the cubicle, so as to inform the control system of the presence of the fault causing the in coming feeder to open.

This disclosure is not limited to the embodiments described above, and instead it can be modified within the scope of the attached patent claims and the inventive concept disclosed herein.

The invention claimed is:

1. A fault current limiting system, the system comprising:
- switching means, which are connected to a circuit breaker for managing a current breaking operation on a power distribution line in absence of fault, said switching means providing a fast switching operation;
- a current path comprising at least a limiting fuse, said path being arranged in parallel to said switching means;
- a switching system to replace a blown set of fuses with an unblown set of fuses after a fault limiting operation has occurred;
- a control unit, which receives signals indicative of starting fault conditions, said control unit estimating the amplitude of the fault current based on said signals, said control unit sending a switch command to the switching means and to the circuit breaker when the fault current is estimated to rise above a predefined threshold,
- said control unit sending a switch command only to the circuit breaker when the fault current is estimated to remain under said predefined threshold.

2. The fault current limiting system of claim 1, wherein the switching means comprises a fast mechanical switch.

3. The fault current limiting system of claim 1, wherein the switching means comprises an explosive cartridge.

4. The fault current limiting system of claim 1, wherein the switching system is provided with at least three unblown sets of fuses.

5. The fault current limiting system of claim 1, wherein the switching system comprises a revolver switch.

6. The fault current limiting system of claim 1, wherein the control unit controls and operates also the switching system.

7. The fault current limiting system of claim 1, further comprising means for short circuit closing after the fault, wherein the short circuit closing completes a restoration sequence of the fault current limiting system.

8. The fault current limiting system of claim 1, further comprising a moveable track, wherein one or more of the components of the fault current limiting system are onboard of the moveable track.

9. An electrical distribution switchboard comprising a fault current limiting system according to claim 1.

10. A method for limiting fault current, the method comprising the following steps:
- providing a current breaking operation on a power distribution line in absence of fault;
- providing a fast switching operation responsive to a fault;
- providing a current path comprising at least a limiting fuse arranged parallel to a fast switching operation path;
- automatically replacing a blown set of fuses with an unblown set of fuses responsive to a fault limiting operation;
- receiving signals indicative of starting fault conditions in a control unit;
- estimating an amplitude of a fault current based on said received signals,
- when the fault current is estimated to rise above a predefined threshold, sending a first switching command from the control unit to effect both the fast switching operation and the current breaking operation, and
- when the fault current is estimated to remain under said predefined threshold, sending another switching command from the control unit to effect only the current breaking operation.

11. A fault current limiting system, the system comprising:
- a fast switch device capable of providing a fast switching operation;
- a circuit breaker connected to the fast switch device, said circuit breaker controlling a current breaking operation on a power distribution line in absence of fault;
- a current path comprising at least a limiting fuse, said current path being arranged in parallel to said fast switch device;
- a fuse revolver switch that automatically replaces a blown set of fuses with an unblown set of fuses responsive to detection of a fault condition;
- a control unit operably connected to receive signals indicative of a fault condition, said control unit estimating an amplitude of the fault current,
- wherein, responsive to said fault condition, said control unit sends a switch command to both the fast switch device and to the circuit breaker when the fault current is estimated to rise above a predefined threshold,
- wherein said control unit sends a switch command only to the circuit breaker when the fault current is estimated to remain under said predefined threshold.

* * * * *